(12) United States Patent
Sirangimoorthy et al.

(10) Patent No.: US 11,392,753 B2
(45) Date of Patent: Jul. 19, 2022

(54) NAVIGATING UNSTRUCTURED DOCUMENTS USING STRUCTURED DOCUMENTS INCLUDING INFORMATION EXTRACTED FROM UNSTRUCTURED DOCUMENTS

(71) Applicant: International Business Machines Corporation, Armonk, NY (US)

(72) Inventors: Jothilakshmi Sirangimoorthy, Canton, MI (US); Ritwik Ray, Apex, NC (US); Hui Wang, Ann Arbor, MI (US); Jonathan Rand, Ann Arbor, MI (US); Scott Carrier, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/785,374

(22) Filed: Feb. 7, 2020

(65) Prior Publication Data
US 2021/0248303 A1 Aug. 12, 2021

(51) Int. Cl.
*G06F 40/106* (2020.01)
*G06F 40/197* (2020.01)
*G06F 40/166* (2020.01)

(52) U.S. Cl.
CPC .......... *G06F 40/106* (2020.01); *G06F 40/166* (2020.01); *G06F 40/197* (2020.01)

(58) Field of Classification Search
CPC .......... G06F 16/30; G06F 16/80; G06F 16/90; G06F 3/048; G06F 40/00; G06F 40/106; G06F 40/197; G06F 40/166
See application file for complete search history.

(56) References Cited

U.S. PATENT DOCUMENTS

| | | |
|---|---|---|
| 5,077,668 A | 12/1991 | Doi |
| 5,918,240 A | 6/1999 | Kupiec et al. |
| 7,233,938 B2 | 6/2007 | Carus et al. |
| 8,239,335 B2 | 8/2012 | Schmidtler et al. |
| 8,255,948 B1 | 8/2012 | Black et al. |

(Continued)

FOREIGN PATENT DOCUMENTS

WO 2018200274 A1 11/2018

OTHER PUBLICATIONS

IBM, "List of IBM Patents or Patent Applications Treated As Related," for U.S. Appl. No. 16/785,374 , filed Feb. 7, 2020.

(Continued)

*Primary Examiner* — Sanchita Roy
(74) *Attorney, Agent, or Firm* — Patterson + Sheridan, LLP (57) ABSTRACT

Aspects of the present disclosure describe techniques for generating a machine learning model for extracting information from textual content. The method generally includes receiving an unstructured document and a structured document including information extracted from the unstructured document and position information associated with the extracted information. The unstructured document is rendered in a first pane, and a graphical rendering of the structured document is rendered in a second pane. The graphical rendering generally may be a structure in which content from the structured document is displayed in a hierarchical format. Each element in the structured document is linked to the rendered unstructured document based on position information included in the structured document.

17 Claims, 6 Drawing Sheets

(56) References Cited

U.S. PATENT DOCUMENTS

| | | | |
|---|---|---|---|
| 9,317,498 B2 | 4/2016 | Baker et al. | |
| 10,366,167 B2 | 7/2019 | Rajendran et al. | |
| 2004/0181746 A1* | 9/2004 | McLure | G06F 40/154 |
| | | | 715/233 |
| 2004/0181749 A1* | 9/2004 | Chellapilla | G06K 9/00449 |
| | | | 715/222 |
| 2004/0243545 A1 | 12/2004 | Boone et al. | |
| 2008/0084573 A1* | 4/2008 | Horowitz | G06F 40/131 |
| | | | 358/1.13 |
| 2010/0161460 A1* | 6/2010 | Vroom | G06Q 40/123 |
| | | | 705/31 |
| 2013/0230246 A1* | 9/2013 | Nuggehalli | G06Q 10/10 |
| | | | 382/176 |
| 2013/0232040 A1* | 9/2013 | Nuggehalli | G06K 9/2054 |
| | | | 705/30 |
| 2013/0311490 A1* | 11/2013 | Mansfield | G06F 40/163 |
| | | | 707/755 |
| 2014/0120513 A1 | 5/2014 | Jenkins et al. | |
| 2014/0244455 A1* | 8/2014 | Huang | G06T 7/00 |
| | | | 705/31 |
| 2015/0193889 A1 | 7/2015 | Garg et al. | |
| 2016/0048655 A1 | 2/2016 | Maitra et al. | |
| 2016/0335403 A1 | 11/2016 | Mabotuwana et al. | |
| 2019/0005012 A1 | 1/2019 | Priestas et al. | |
| 2019/0303412 A1 | 10/2019 | Ray et al. | |
| 2020/0110834 A1 | 4/2020 | Croutwater et al. | |
| 2020/0159989 A1* | 5/2020 | Banaszak | G06K 9/00993 |
| 2020/0210490 A1 | 7/2020 | Hutchins | |
| 2021/0056164 A1 | 2/2021 | Mustafi | |
| 2021/0232613 A1 | 7/2021 | Raval Contractor et al. | |

OTHER PUBLICATIONS

U.S. Appl. No. 16/785,329, "Extracting Information From Unstructured Documents Using Natural Language Processing And Conversion Of Unstructed Documents Into Structured Documents," filed Feb. 7, 2020.

Shindo et al., "PDFAnno: A Web-based Linguistic Annotation Tool for PDF Documents," 5 pages.

ibm.com, "Classify, extract and act on the data locked in your content," [Accessed Online] https://www.ibm.com/products/content-analyzer.

* cited by examiner

NAVIGATING UNSTRUCTURED DOCUMENTS USING STRUCTURED DOCUMENTS INCLUDING INFORMATION EXTRACTED FROM UNSTRUCTURED DOCUMENTS

BACKGROUND

Aspects of the present disclosure relate to extracting content from unstructured documents using natural language processing techniques, and more specifically to techniques for generating structured documents from unstructured documents and processing the structured documents using natural language processing techniques.

Many real-world operations are defined in terms of complex, lengthy documents or sets of documents. These documents may generally be unstructured or semi-structured, in which relevant information is included in paragraphs of textual content or in tables or other organizational constructs that group similar information together. For example, in a healthcare scenario, an employer may offer various health insurance plans to its employers, and the various health insurance plans may be summarized in a summary plan document that identifies, in a table or other organizational construct, various characteristics of the health insurance plans offered to an employee. The summary plan document may further include additional information that may be applicable to all plans offered to an employee or certain plans offered to an employee, and this additional information may be maintained in unstructured text (e.g., paragraphs, bulleted lists, etc.). In another example, retirement plans may also be summarized in summary plan documents that outline relevant information about the various retirement plans offered to an employee in a combination of tabular and unstructured text. In still further examples, various documents in industrial environments may include summaries of requirements for physical goods to be produced, such as size, materials, tolerances, and the like, as well as more detailed information included in unstructured text.

Generally, the documents discussed above may include a significant amount of domain-specific information. For example, a healthcare summary plan document may include information that is specific to the domain of health insurance plans, such as copay information, in-network/out-of-network definitions, and the like. A retirement summary plan document may include information that is specific to the domain of retirement plans, such as minimum age requirements for participation, vesting information, and the like. While these documents include significant amounts of domain-specific information, these documents may be difficult to interpret and to extract information from.

SUMMARY

One aspect of the present disclosure provides a method for extracting information from an unstructured document. The method generally includes receiving a source document from which information is to be extracted. The source document is converted to a text document file. Information is extracted from the text document file based on a domain-specific natural language processing engine and a domain-specific ontology. The extracted information is linked to position information in the source document, and a structured document is generated. The structured document generally includes the extracted information and the linked position information.

Another aspect of the present disclosure provides a system for extracting information from an unstructured document. The system generally includes a processor and a memory having instructions which, when executed by the processor, performs an operation for extracting information from an unstructured document. The operation generally includes receiving a source document from which information is to be extracted. The source document is converted to a text document file. Information is extracted from the text document file based on a domain-specific natural language processing engine and a domain-specific ontology. The extracted information is linked to position information in the source document, and a structured document is generated. The structured document generally includes the extracted information and the linked position information.

Still another aspect of the present disclosure provides a computer-readable medium having instructions stored thereon which, when executed by a processor, performs an operation for extracting information from an unstructured document. The operation generally includes receiving a source document from which information is to be extracted. The source document is converted to a text document file. Information is extracted from the text document file based on a domain-specific natural language processing engine and a domain-specific ontology. The extracted information is linked to position information in the source document, and a structured document is generated. The structured document generally includes the extracted information and the linked position information.

One aspect of the present disclosure provides a method for presenting information extracted from an unstructured document in a graphical user interface. The method generally includes receiving an unstructured document and a structured document including information extracted from the unstructured document and position information associated with the extracted information. The unstructured document is rendered in a first pane, and a graphical rendering of the structured document is rendered in a second pane. The graphical rendering generally may be a structure in which content from the structured document is displayed in a hierarchical format. Each element in the structured document is linked to the rendered unstructured document based on position information included in the structured document.

Another aspect of the present disclosure provides a system. The system generally includes a processor and a memory having instructions stored thereon which, when executed by the processor, performs an operation for presenting information extracted from an unstructured document in a graphical user interface. The method generally includes receiving an unstructured document and a structured document including information extracted from the unstructured document and position information associated with the extracted information. The unstructured document is rendered in a first pane, and a graphical rendering of the structured document is rendered in a second pane. The graphical rendering generally may be a structure in which content from the structured document is displayed in a hierarchical format. Each element in the structured document is linked to the rendered unstructured document based on position information included in the structured document.

Still another aspect of the present disclosure provides a computer-readable medium having instructions stored thereon which, when executed by a processor, performs an operation for presenting information extracted from an unstructured document in a graphical user interface. The operation generally includes receiving an unstructured document and a structured document including information extracted from the unstructured document and position information associated with the extracted information. The unstructured document is rendered in a first pane, and a graphical rendering of the structured document is rendered in a second pane. The graphical rendering generally may be a structure in which content from the structured document is displayed in a hierarchical format. Each element in the structured document is linked to the rendered unstructured document based on position information included in the structured document.

DETAILED DESCRIPTION

Unstructured documents are generally documents in which information is stored in a free-form manner that is not dictated by an underlying structure or relationships between information stored in the document. Unstructured domain-specific documents, such as summary plan description documents, technical specification documents, and the like generally are large documents that are difficult to understand and include a significant amount of domain-specific information. To extract information from these domain-specific documents, the documents may be converted from an image-based format (e.g., the Portable Document Format) to a plaintext file, and the plaintext file may be processed through a natural language processing engine and/or other analytics engine to extract relevant information from the document. However, conversion of a document to a plaintext file may result in the loss of some information. For example, positional information that may be relevant to content in a document, such as the position of cells in a table and the associated text in each cell, may be lost in the conversion of a document in an image-based format to a plaintext file. Because the positional information and other relevant information may be lost in the conversion of a document from an image-based format to a plaintext file, it may be difficult to map information extracted from the plaintext file back to the original document and to generate a navigable structure that can be used to traverse the document.

Aspects of the present disclosure provide techniques for extracting information from unstructured documents by generating structured documents that are analyzed by natural language processing engines and other analytics services to extract relevant information. As discussed in further detail below, an unstructured document may be converted to a structured document that maintains contextual information associated with the textual content in the unstructured document. The contextual information can be used, in conjunction with the identification of relevant text by a natural language processing and/or other analytics engines, to generate a structured document that links the extracted relevant text to the position of such text in the unstructured document. Aspects of the present disclosure further provide techniques for rendering and navigating through unstructured documents using a structured document and the information extracted from the structured document. The unstructured document may be rendered beside a navigation structure generated from information extracted from the structured document, and user interaction with the navigation structure may allow for navigation to the location of various elements in the unstructured document. By doing so, a user can quickly navigate to the location of relevant information in the document and can verify that the information was extracted from the unstructured document correctly.

Figure 1:
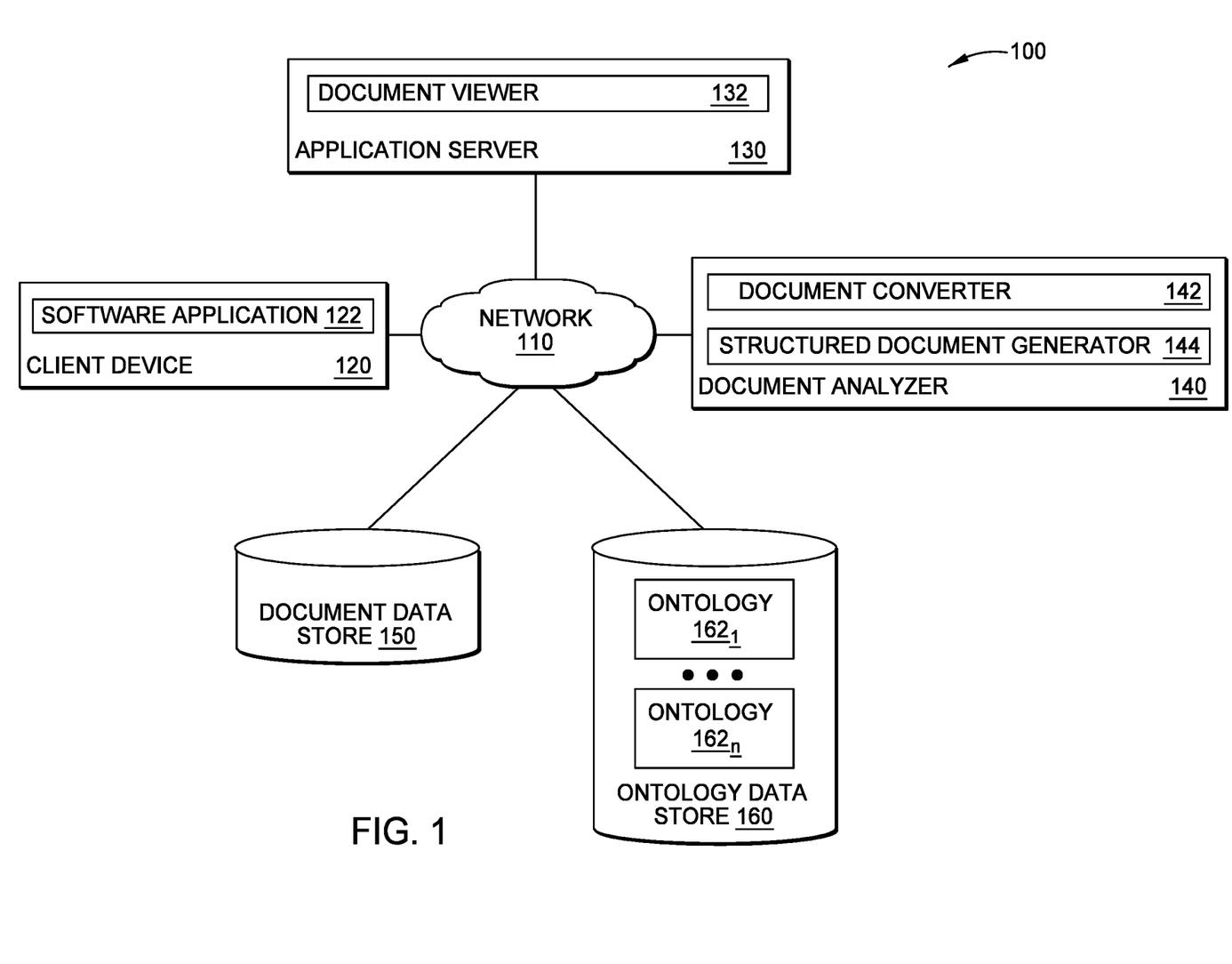
FIG. 1 illustrates an example networked computing environment in which information is extracted from an unstructured document using structured documents generated from the unstructured document and natural language processing on the unstructured and structured documents, according to one embodiment.

FIG. 1 illustrates an example networked computing environment in which information is extracted from an unstructured document using structured documents generated from the unstructured document, according to an embodiment of the present disclosure. As illustrated, computing environment 100 includes a client device 120, an application server 130, a document analyzer 140, a training data store 150, and an ontology data store 160.

Client device 120 is generally representative of computing devices on which a user can access a service executing on application server 130 to view and navigate through an unstructured document and access a service executing on document analyzer 140 to initiate extraction of information from an unstructured document. As illustrated, client device includes a software application 122.

Software application 122 generally provides an interface through which a user can invoke information extraction operations at document analyzer 140 and view the unstructured document through services executing on application server 130. In some embodiments, software application 122 may be a web browser or other application that allows a user to interact with an application hosted remotely on application server 130. Generally, to invoke information extraction operations at document analyzer 140, software application 122 can transmit a command to document analyzer 140 to initiate the process of generating structured documents from the unstructured document and extract information from the structured documents. Generally, the command may include the document to be analyzed or information identifying a location at which the document to be analyzed is stored, and the document may be an unstructured document (e.g., a document in an image-based format) from which information is to be extracted.

Software application 122 may further provide an interface through which the unstructured document and a navigation pane generated from the analysis of the unstructured document may be viewed. The content of the navigation pane may include one or more links to the locations of extracted information in the unstructured document such that when a user selects a link in the navigation pane, the portion of the unstructured document located at the location associated with the selected link may be viewed in a first pane. Software application 122 may also provide a mechanism through which a user can correct the extracted information displayed in the navigation pane and identify additional relevant information to be included in the navigation pane. The corrected information and additional identified information may be added to a structured document (e.g., stored in document data store 150) specifying the extracted information and location of the extracted information, and the updated structured document may be used in future viewing of the source unstructured document from which the information was extracted.

Application server 130 generally includes a document viewer 132. Document viewer 132 generally provides an interface through which a user can view an unstructured document and navigate through the unstructured document. The interface may include a first pane in which the unstructured document is rendered and a second pane in which a navigation structure is rendered. The first pane may integrate a document viewer that scrolls to a specified portion of the unstructured document in response to a command to navigate to the specified portion of the document. The command to navigate to the specified portion of the document may include, for example, a command to navigate to an anchor specified in an unstructured document (e.g., a uniform resource locator (URL) including an anchor tag), a command to navigate to a specific page or section of the unstructured document, or the like.

The navigation structure rendered in the second pane may be, for example, a navigation tree or other hierarchical structure in which links to specified portions of the unstructured document containing the information associated with the link displayed in the navigation tree. As discussed in further detail below, each link in the navigation structure may be associated with a bounding box indicating a location in the unstructured document at which the information associated with the link is found. The bounding box may, for example, be determined by working backwards from one or more intermediate documents generated from the unstructured document to the unstructured document itself. For example, the bounding box may be generated by first identifying a set of characters in an intermediate plaintext document used by document analyzer 140 to extract information from the unstructured document. The set of characters may be defined, for example, as an offset from a starting character of a text element (e.g., a paragraph, cell in a table, etc.) in an intermediate document, and the identified offset information in one intermediate document may be linked to position information in other intermediate documents generated from the unstructured document. This position information may include, for example, names of cells in a table, named anchors in a document, absolute or relative position information on a page of the unstructured document (e.g., an absolute pixel location, given an assumed resolution of a page in a document, or a relative pixel location as a percentage of the height and width of a page in the document), and the like. Based on the position information in the structured document and the one or more intermediate documents, the location of extracted information may be identified in the unstructured document, and one or more visual effects may be rendered with respect to the location of the extracted information. For example, upon selection of a link in the navigation structure, the content associated with the link may be highlighted using a color unique to the content associated with the link. In another example, a colored box may be drawn around the content associated with the link.

In some embodiments, the navigation structure may provide a mechanism for a user to correct the content extracted from an unstructured document. As text recognition systems (e.g., optical character recognition systems) may not always accurately convert text in an image to the correct textual content for various reasons (e.g., image quality, document resolution, etc.), the text extracted from the document may not be accurate. Thus, in a verification process, a user may be permitted to examine the document at the location at which extracted information is linked, and if the extracted information is inaccurate, the user can manually overwrite the machine-extracted information with the accurate data. The accurate data may be written to the structured document storing the data extracted from the unstructured document for future use.

In some embodiments, document analyzer 140 may not extract all of the relevant data from an unstructured document. For example, document analyzer 140 may time out before analyzing the entirety of an unstructured document, or document content may simply be missed during analysis. While a user is viewing the unstructured document, the user may select relevant content in the unstructured document. Document viewer 132 may parse the selected portion of the unstructured document to identify the selected textual content and the positon of the selected portion. Based on the identified portion of the unstructured document, document viewer 132 can add information to the structured document to include one or more references, in one or more structured text elements, to the specified information deemed to be relevant by a user of the document viewer 132. In some embodiments, document viewer 132 may search the one or more intermediate documents to identify other location pointers in the intermediate documents to associate with the identified portion of the unstructured document and the text extracted therefrom and write the identified location pointers to the structured document with an identification of the intermediate document(s) associated with the identified location pointers.

Document analyzer 140 generally receives an unstructured document for analysis and extracts information from the unstructured document into a structured document using a natural language processing engine and a domain-specific ontology (e.g., one or more of ontologies $162_1$-$162_n$. The domain-specific ontology may be defined a priori based on the type of document that is to be analyzed by document analyzer 140. Where document analyzer 140 is configured to extract information from documents in a specific domain (e.g., healthcare summary plan documents, retirement plan documents, etc.), the domain-specific ontology may be hard-coded in document analyzer 140. Where document analyzer 140 is a general purpose document analyzer that can be used to analyze unstructured documents from various domains, document analyzer 140 can determine the domain-specific ontology to use based on user input (e.g., an explicit indication of the type of document provided to document analyzer 140) or based on a natural language analysis of the unstructured document to identify the domain of the document based on key words in the document (e.g., where words like "hospitalization" or "medical" might be associated with a healthcare document domain, while words like "retirement" or "minimum distribution" might be associated with a retirement document domain). As illustrated, document analyzer 140 includes a document converter 142 and a structured document generator 144.

Document converter 142 generates one or more intermediate documents from an unstructured document received for analysis. To generate the one or more intermediate documents from the unstructured document, document converter 142 can first convert the unstructured document to plaintext file using an optical character recognition engine or other text recognition engines. The optical character recognition engine may be integral to document converter 142 or a remote service that returns a plaintext file in response to a request to generate a plaintext file from an input document. The plaintext file may be the first of a plurality of intermediate documents generated by document converter 142 for use in extracting information from the unstructured document. The output of the optical character recognition engine may be a plaintext file including one or more annotations indicative of a position in which textual content is located in the unstructured document. For example, the optical character recognition engine may generate a plaintext file with one or more text elements, and each text element in the plaintext file may include information identifying where in the unstructured document each text element is located. In some embodiments, the information identifying a location in the unstructured document associated with a text element may be a unique identifier generated by the optical character recognition engine based, for example, formatting information in the unstructured document. For example, new position indicators may be added based on predetermined rules that generate location markers where the typeface or type formatting is indicative of a section break, where a page break exists in a document, and the like.

The plaintext file resulting from processing the unstructured document through an optical character recognition engine may be a Hypertext Markup Language (HTML) representation of the unstructured document. Each text element in the HTML representation may include position information associated with the location of the text element the unstructured document. This position information may be, for example, a region within the coordinate system of the unstructured document in which the text extracted from the unstructured document was extracted. Generally, the plaintext file may include structured text including text content from tables or other organizational structures parsed from the unstructured document. The structured text, which may be formatted in a Javascript Object Notation (JSON) format, may retain the tabular format of text extracted from a table by storing column headers, row headers, and cell content for the table. Positional information in the HTML representation may be represented by starting and ending offsets of the extracted text within an HTML string. For example, given an HTML string that may be represented as an array of i characters with indices 0-(i-1), a string may be represented by a starting and ending index in the array, as positive offsets from the starting character in the string, or as negative offsets from the i-1$^{th}$ character in the string.

The plaintext file may further be processed into a first intermediate document to add one or more text elements to the intermediate document in a structured format. These text elements may include, for example, the text elements not already included in tables in the plaintext document. Text may be concatenated into a series of flattened text elements, and each text element may be associated with a location in an array of text locations for content in the plaintext file. Generally, the position information may include bounding box coordinates in the unstructured document and character offsets of a string in the plaintext file.

The first intermediate document may be processed to reorganize tabular content stored in a structured text construct. Generally, the structured text may be reorganized to add row headers, section headers, and other information header information included in the document that signifies information about the content in a portion of a document.

Finally, the first intermediate document may be processed into a second intermediate document that adds flattened text elements to the body cells of a structured text construct including the contents of a table. Section headers, row headers, column headers, and body cell text may be concatenated into a series of flattened text elements. Location data may be stored for each flattened text element generated by concatenating section headers, row headers, column headers, and body cell text into a flattened text element. As discussed above, the position information may include bounding box coordinates in the unstructured document and character offsets of a string in the plaintext file Structured document generator 144 uses the intermediate document(s) generated by document converter 142 to generate a structured document including relevant information in the unstructured document. Generally, to identify relevant information in the unstructured document, structured document generator 144 can use a natural language processing engine trained on a domain-specific corpus of information to process the intermediate document(s) generated by document converter 142. For example a structured document generator 144 used to extract information out of healthcare summary plan documents can use a natural language processing engine trained to recognize relevant information from other healthcare plan description documents; a structured document generator 144 used to extract information out of retirement plan documents can use a natural language processing engine trained to recognize relevant information from other retirement plan documents, and the like. The natural language processing engine may be associated with a domain-specific ontology that identifies relationships between specific domain-specific concepts in a document. For example, an ontology for healthcare summary plan descriptions may include relationships between healthcare-specific constructs, such as in-network versus out-of-network coverage, deductibles, co-pays, and the like.

During the extraction process, structured document generator 144 can record location information associated with the flattened text elements in the intermediate document and save the extracted text and associated location information in a structured document. In some embodiments, the structured document may also include the bounding box associated with the origin of the text in the unstructured document. Once structured document generator 144 generates a structured document according to the domain-specific ontology, structured document generator 144 can commit the structured document to document data store 150. In some embodiments, structured document generator 144 can generate the structured document as a parseable text file (e.g., in a JSON format). In some embodiments, structured document generator 144 can generate the structured document as one or more database records which, when combined, form a structured document that identifies the relevant information extracted from the unstructured document and position information (e.g., text character offsets and bounding boxes in a graphical rendering of the unstructured document) associated with the identified relevant information.

Document data store 150 is generally representative of a data repository in which unstructured documents, structured documents including information extracted from the unstructured documents, and other textual content used to train the natural language processing engine may be stored. Document data store 150 may include a plurality of separate repositories in which unstructured and structured may be stored. These repositories may be, for example, repositories for different domains of documents, such as technical requirement documents, medical diagnosis documents, and other classes of documents which may be analyzed using document analyzer 140. Document data store 150 may be structured as a relational or a non-relational database, a flat file store, a hierarchical file store, or any other storage system in which documents used to train relevancy and knowledge graph models may be stored.

Ontology data store 160 is generally representative of a data repository in which domain-specific ontologies may be stored for use by document analyzer 140 in extracting relevant data from an unstructured document. As illustrated, ontology data store 160 may store a plurality of ontologies $162_1$-$162_n$. Each ontology 162 may correspond to a specific domain of documents that may be analyzed by document analyzer 140. For example, one ontology 162 may be associated with healthcare plan summary documents, another ontology 162 may be associated with retirement plan summary documents, and the like.

Figure 2:
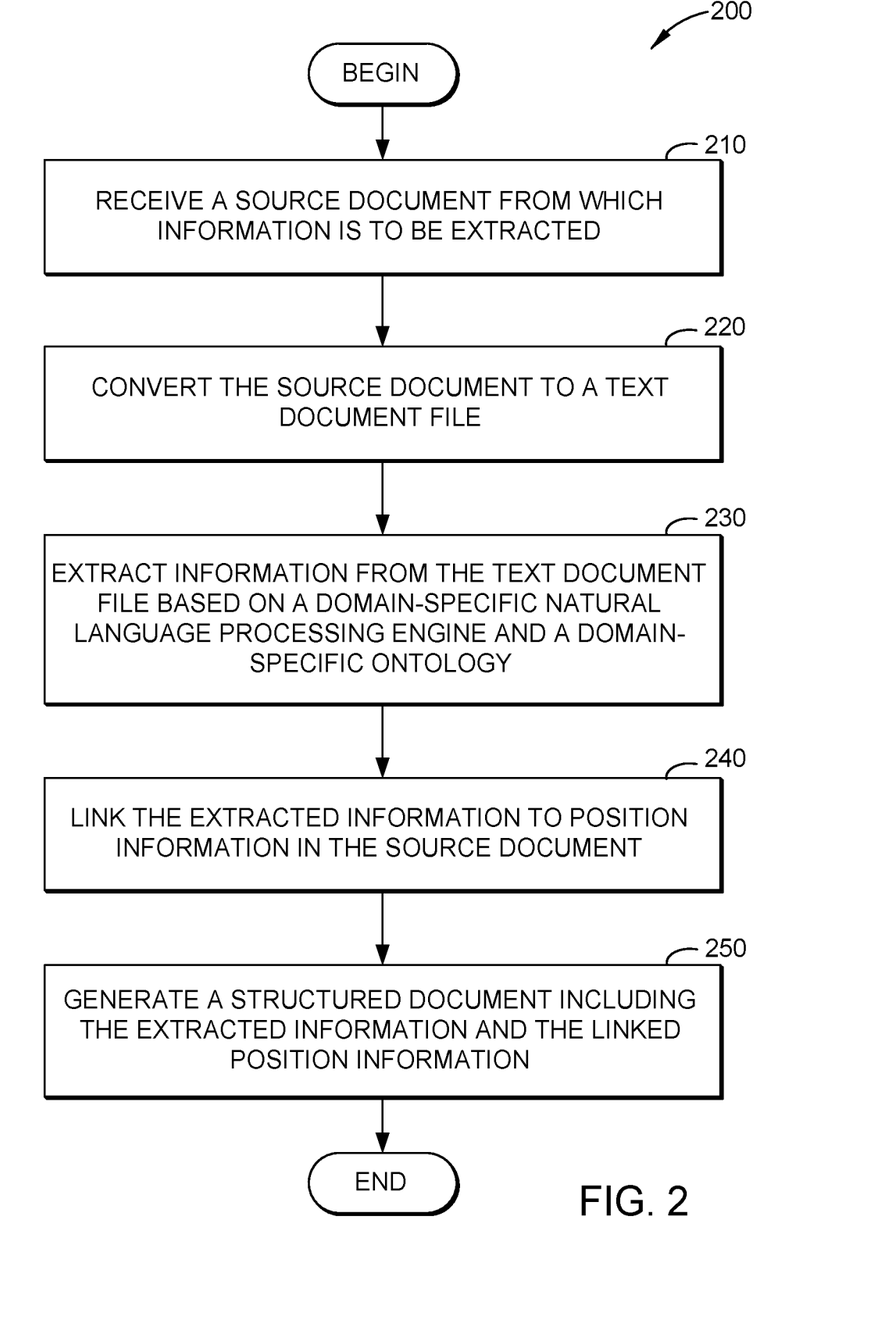
FIG. 2 illustrates example operations for extracting information from an unstructured document using structured documents and natural language processing, according to one embodiment.

FIG. 2 illustrates example operations 200 that may be performed by a system to extract information from an unstructured document using natural language processing techniques that preserves positional information associated with the extracted information. As discussed, the preservation of positional information associated with the extracted information may be used in rendering an unstructured document with a navigation structure that allows a user to jump to locations in the unstructured document at which extracted information is stored.

As illustrated, operations 200 begin at block 210, where a system receives a source document from which information is to be extracted. The source document may be, for example, a document in a file format used by word processing programs (e.g., an OpenDocument Format file, an Office Open XML file, etc.), an image-based file format (e.g., a Portable Document Format file), or the like. Generally, the source document may be associated with a specific domain of knowledge that indicates the types of information that may be relevant to the document (or type of document).

At block 220, the system converts the source document to a text document file. To convert the source document to a text document file, a first intermediate file may be generated by passing the unstructured source document to an optical character recognition engine. The optical character recognition engine may generate a plaintext file that includes the text content extracted from the source document and a structure defining the characteristics of tabular data included in the source document. The first intermediate file may include position information (e.g., vertical/horizontal position information using the coordinate system of the source document) that a system can use to identify locations of relevant text in the source document. One or more other intermediate files may be generated to convert unstructured text content into structured text content that can be analyzed by a natural language processing engine to extract information from the text document. The resulting file may be a structured text document representative of the unstructured source document that includes position information for each text element included in the source document.

At block 230, the system extracts information from the text document file based on a domain-specific natural language processing engine and a domain-specific ontology. The domain-specific natural language processing engine may be trained to recognize information of relevance in a particular type of document (e.g., healthcare summary plan descriptions, retirement summary plan descriptions, industrial specification documents, etc.), and the domain-specific ontology may specify relationships between different words or concepts in the particular type of document.

At block 240, the system links the extracted information to position information in the source document. As discussed, the extracted information may be associated with a particular set of characters in the text document file and/or one or more intermediate documents generated from the source document. The set of characters, which may be identified by a character offset or indices of characters in a document, may be linked to coordinate position information in the unstructured document through positioning information (e.g., table cell identifiers) included on one or more intermediate documents.

At block 250, the system generates a structured document including the extracted information and the linked position information. As discussed, the structured document may be a document written according to a hierarchical schema in which information extracted from the document is stored. In some embodiments, the structured document may be stored in a data repository as a series of database records that, when aggregated, may constitute a single structured document that may be used to generate a navigation structure for the document.

Figure 3:
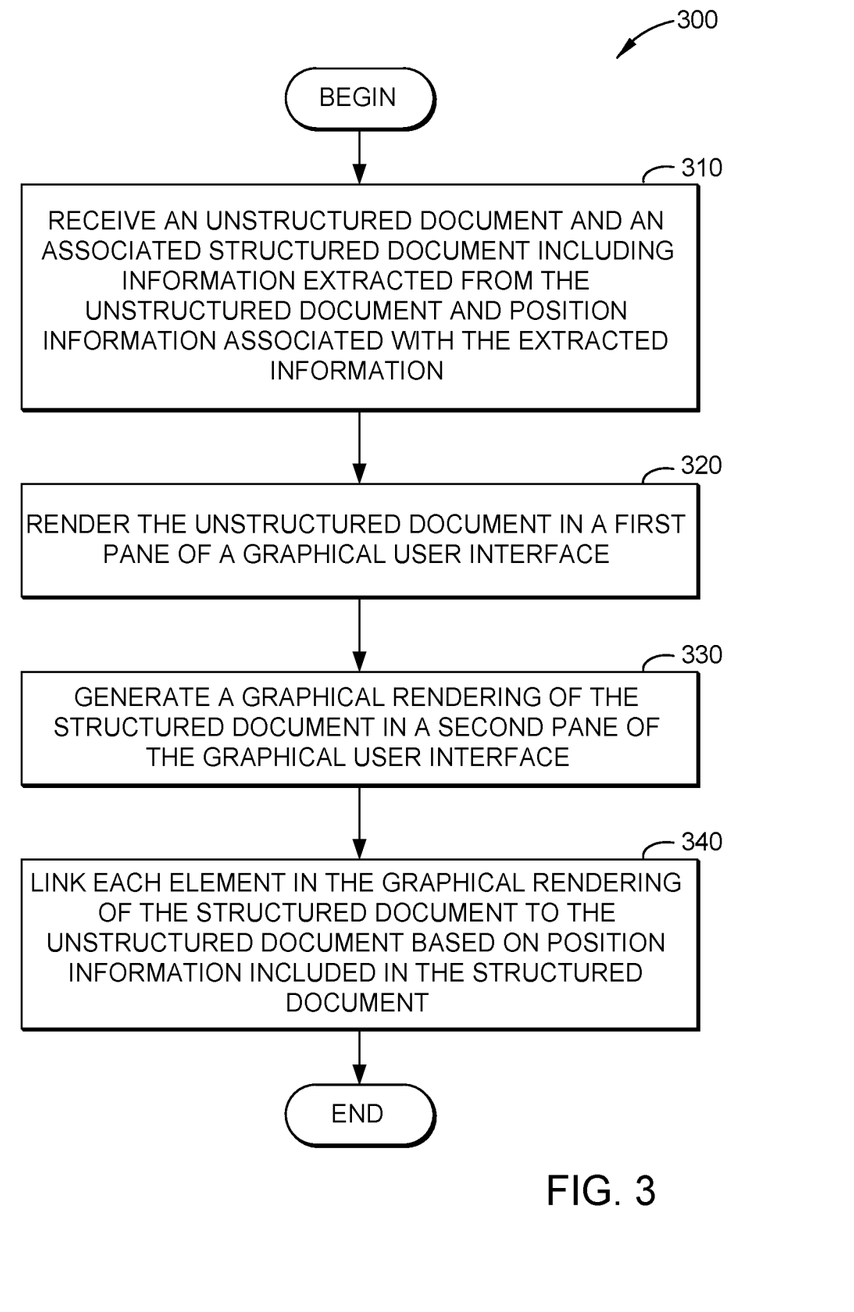
FIG. 3 illustrates example operations for presenting information extracted from an unstructured document in a graphical user interface, according to one embodiment.

FIG. 3 illustrates example operations 300 that may be performed to render an unstructured document and a navigation structure generated from a structured document including information extracted from the unstructured document.

Operations 300 begin at block 310, where a system receives an unstructured document and an associated structured document including information extracted from the unstructured document and position information associated with the extracted information. The structured document may be formatted using a hierarchical schema that can be translated into a hierarchical navigation structure. Generally, the hierarchical schema may be structured such that nesting of elements within other elements indicates a parent-child relationship between different pieces of data extracted from the structured document.

At block 320, the system renders the unstructured document in a first pane of a graphical user interface. The first pane may include a document viewer that supports documents in a set of document file formats typically used for unstructured documents. For example, the document viewer may be an HTML rendering engine used to display documents in the HTML file format, a PDF rendering engine, and the like. In some cases, the document viewer may allow users to select information in a document but may not include editing functions that allow a user to change the content of the unstructured document.

At block 330, the system generates a graphical rendering of the structured document in a second pane of the graphical user interface. The graphical rendering of the structured document may be, for example, a navigation tree or other hierarchical structure that can be used to represent hierarchical data in the structured document (e.g., as a nested list of data). As discussed, the structured document may include extracted information in a hierarchy of textual elements in the structured document, where different levels of information represent parent-child relationships between higher and lower levels of information.

At block 340, the system links each element in the graphical rendering of the structured document to the unstructured document based on position information included in the structured document. By linking elements in the graphical rendering of the structured document to the unstructured document, the system can allow for navigation through the unstructured document based on interaction with elements in the graphical rendering of the structured document. As discussed, the position information may be determined based on position information included in one or more intermediate documents generated from the structured document, which may be character offsets relative to a string in an intermediate document. These character offsets may be mapped back to coordinate position information in the unstructured document. Each element in the graphical rendering of the structured document may thus be linked to the coordinates in the unstructured document at which the extracted text is located, and user selection of an element in the graphical rendering of the structured document may cause the document viewer to render the unstructured document at the coordinate position associated with the selected element.

Figure 4:
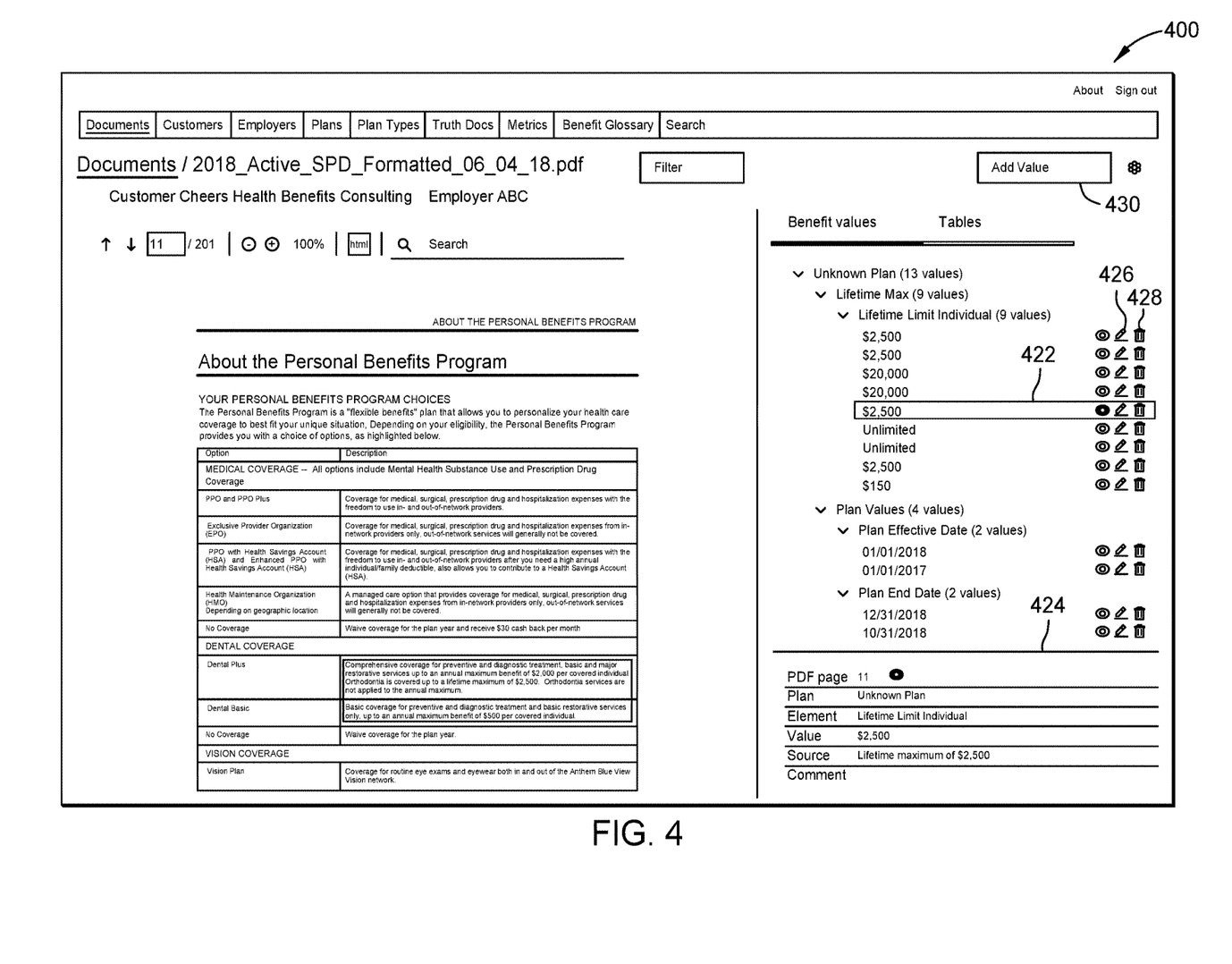
FIG. 4 illustrates an example graphical user interface in which an unstructured document and a structured document including information extracted from the unstructured document is displayed, according to one embodiment.

FIG. 4 illustrates a graphical user interface displaying an unstructured document and a navigation pane for the unstructured document populated based on a structured document including information extracted from the unstructured document. As illustrated, graphical user interface 400 includes a first pane 410 and a second pane 420.

First pane 410 generally includes a document viewer that allows a user to view an unstructured document, and second pane 420 generally includes a hierarchical structure viewer in which the structured document is rendered. Each element from the structured document displayed in the hierarchical structure viewer of second pane 420 may be user-selectable. When a user selects an element 422 in second pane 420, corresponding to an element extracted from the unstructured document rendered in first pane 410, a system can display additional information about the selected element in an information viewer 424 in second pane 420. To do so, the system can retrieve information from the structured document associated with the selected element. The retrieved information may include, for example, positional information associated with the selected element and other relevant information associated with the selected element. For example, as illustrated, the selected element 422 is associated with information located at page 11 of the unstructured document displayed in first pane 410, references a "Lifetime Limit Individual" property of the plan(s) described in the unstructured document, and has a value of "$2,500". This information may be displayed in information viewer 424 in a read-only format or an editable format, based on user selection(s) in the second pane 420.

The system may further display the portion of the unstructured document at which the selected element is located in first pane 410. In some embodiments, the system can additionally render one or more visual effects in respect of the portion of the document at which the selected element is located. For example, a bounding box 412 can be drawn in first pane 410 around the portion of the document at which the selected element 422 is located, text in the portion of the document at which the selected element is located may be highlighted, and so on. These visual effects may be rendered based on the positional information associated with the selected element 422 in the structured document generated from the unstructured document displayed in first pane 410. As discussed, this positional information may include a textual offset in one or more intermediate documents and coordinates in the unstructured document displayed in first pane 410.

Second pane 420 generally also includes one or more selectable icons or buttons that allow a user to edit or delete existing information extracted from the unstructured document into the structured document and/or add information to the structured document from the unstructured document. For example, each item included in the structured document and extracted from the unstructured document may be associated with an edit button 426 and a delete button 428. If a user selects the edit button 426 associated with an item in the structured document, the system can populate information viewer 424 with the information associated with the item in the structured document and make one or more user interface elements in information viewer 424 editable. When a user indicates that editing is complete, the system can write the edited information back to the structured document. If a user selects the delete button 428 associated with an item in the structured document, the system can remove the item from the structured document and re-render the hierarchical structure displayed in second pane 420.

To add a value, a user can initiate the process by interacting with the add value button 430 displayed in the second pane 420. After initiating the process, the user can select a portion of the unstructured document in first pane 410. The system can identify the portion of the structured document to add information to based on the position of the selected portion of the unstructured document. At the identified portion of the structured document, the system can add one or more text elements representing the selected portion of the unstructured document and position information in the unstructured document such that when rendered in second pane 420, the selected portion of the document can be displayed in first pane 410.

Figure 5:
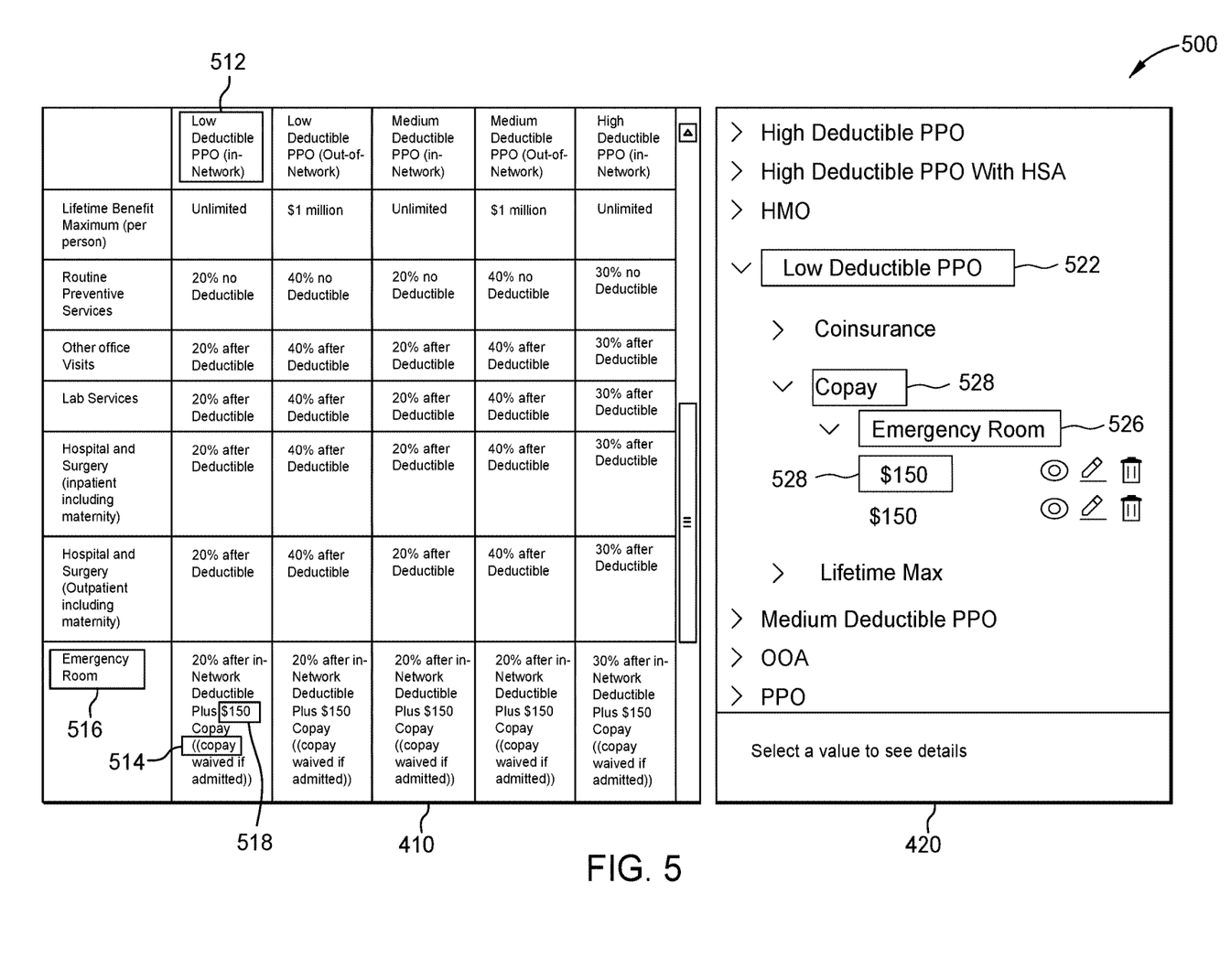
FIG. 5 illustrates an example graphical user interface in which visual effects are rendered in relation to information extracted from an unstructured document, according to one embodiment.

FIG. 5 illustrates a graphical user interface displaying an unstructured document and a navigation pane for the unstructured document. Like FIG. 4, graphical user interface 500 includes a first pane 410 and a second pane 420.

As illustrated, extracted text 528 may be selected for analysis by a user by clicking on a button provided in second pane 420 for viewing extended information (e.g., location and relationship information) about extracted text 528. In some embodiments, by selecting extracted text 528, the system can render one or more visual effects for elements in the structured document that correspond to parent elements of the selected extracted text 528. In this example, extracted text 528 may be an immediate child of extracted text 526, which may be an immediate child of extracted text 524, which may be an immediate child of extracted text 522. Extracted text 522 may represent the ultimate parent text object in the hierarchical navigation structure for extracted text 528. In this example, the user has selected a monetary amount that relates to emergency room visits, which in turn relates to copay amounts the user is responsible for, which ultimately relates to information about a "low deductible PPO" in the unstructured document rendered in first pane 410.

Based on user selection of extracted text 528, the system can examine positional information in the structured document generated from the unstructured document rendered in first pane 410 to identify the locations of each of extracted texts 522, 524, 526, and 528 in the unstructured document. As discussed, the identified locations of each of the extracted texts may include text offsets in a string and coordinate positions of the extracted texts in the unstructured document. Based on the identified locations of an extracted text, the system can render one or more visual effects around the relevant text in the unstructured document rendered in first pane 410 and corresponding visual effects around the extracted text in second pane 420. For example, different colored bounding boxes may be rendered in first pane 410 and second pane 420 for each extracted text relevant to the user selected extracted text (i.e., relevant to extracted text 528). As illustrated, bounding box 512 may correspond to extracted text 522; bounding box 514 may correspond to extracted text 524; bounding box 516 may correspond to extracted text 526; and bounding box 518 may correspond to extracted text 528. To allow for quick recognition of extracted text elements in second pane 420 and the corresponding relevant text in the unstructured document rendered in first pane 410, the system can render the same or similar visual effects to the bounding box in first pane 410 and the associated relevant text in second pane 420. In this example, bounding box 512 and a box rendered around the associated extracted text 522 may have a border in a first color; bounding box 512 and a box rendered around the associated extracted text 524 may have a border in a second color; bounding box 516 and a box rendered around the associated extracted text 526 may have a border in a third color; and bounding box 518 and a box rendered around the associated extracted text 528 may have a border in a fourth color. In other examples, different visual effects may be rendered in the unstructured document displayed in first pane 410 for each of the extracted texts 522, 524, 526, and 528. For example, different colored highlighting may be applied to the relevant text in the unstructured document displayed in first pane 410 based on the coordinates of the bounding boxes discussed above; the color of the relevant text in the unstructured document displayed in first pane 410 may be changed; and so on.

Figure 6:
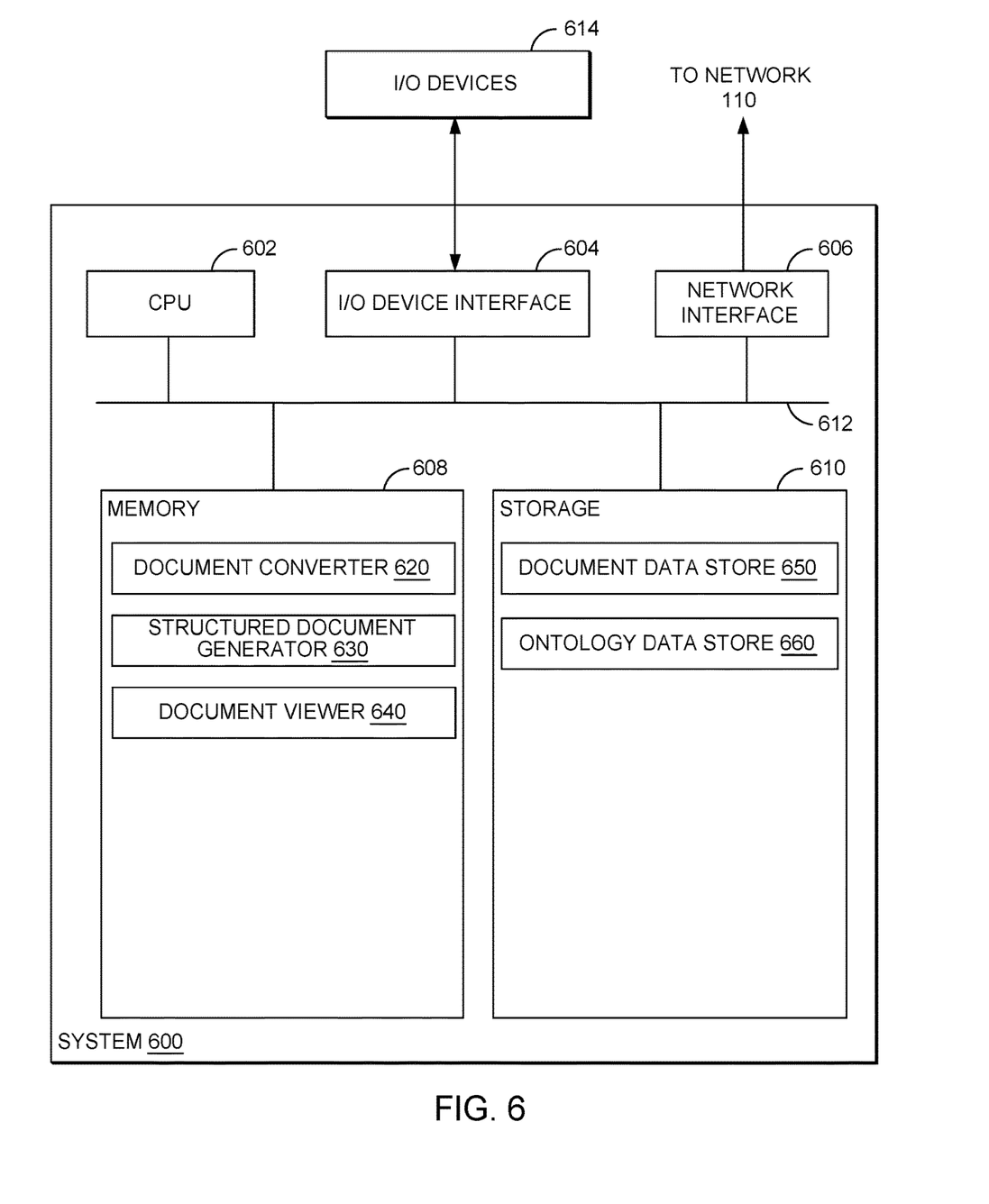
FIG. 6 illustrates an example system in which aspects of the present disclosure may be performed.

FIG. 6 illustrates an example system 600 that extracts information from an unstructured document into a structured document that can be used to navigate through the unstructured document using natural language processing techniques and an ontology associated with a type of the unstructured document, according to an embodiment. As illustrated, system 600 includes, without limitation, a central processing unit 602, one or more I/O device interfaces 604, which may allow for the connection of various I/O devices 614 (e.g., keyboards, displays, mouse devices, pen input, etc.) to the system 600, network interface 606, a memory 608, storage 610, and an interconnect 612.

CPU 602 may retrieve and execute programming instructions stored in the memory 608. Similarly, the CPU 602 may retrieve and store application residing in the memory 608. The interconnect 612 transmits programming instructions and application data among the CPU 602, I/O device interface 604, network interface 606, memory 608, and storage 610. CPU 602 is included to be representative of a single CPU, multiple CPUs, a single CPU having multiple processing cores, and the like. Additionally, the memory 608 is included to be representative of a random access memory. Furthermore, storage 610 may be a disk drive, a solid state drive, a phase change memory device, or the like. Although shown as a single unit, the storage 610 may be a combination of fixed and/or removable storage devices, such as fixed disc drives, solid state drives, removable memory cards or optical storage, network attached storage (NAS), or a storage area network (SAN).

As illustrated, memory 608 includes a document converter 620, a structured document generator 630, and a document viewer 640. Document converter 620 generally receives a document for analysis and generates one or more intermediate plaintext documents that structured document generator 630 can use to generate the structured document. The received document may be, for example, in an image-based file format (e.g., the Portable Document Format) or other document file formats that may be rendered on a screen. Using an optical character recognition engine, document converter 620 can convert the unstructured document to a plaintext document that may serve as the first of a plurality of intermediate documents used to generate the structured document. Text content in tables may be formatted in the first intermediate document in a manner that preserves information about each cell of the table, and successive intermediate documents can add structure around text elements in the unstructured document that are not included in a table in the unstructured document. Each text element may also include position information, such as character offsets and bounding box coordinates in the unstructured document, which may be used by document viewer 640 in rendering the unstructured document and applying visual effects to portions of the unstructured document.

Structured document generator 630 generally uses the intermediate documents to generate a structured document including relevant information extracted from the unstructured document. To generate a structured document, structured document generator 630 uses a domain-specific natural language processing engine and a domain-specific ontology trained to recognize words or phrases of particular significance to a class of documents. The structured document generated by structured document generator 630 may be a hierarchical document which document viewer 640 can use in rendering a navigation structure that preserves the hierarchy and the relationships between the data extracted from the document.

Document viewer 640 generally provides a graphical user interface in which an unstructured document is rendered in a first pane of the graphical user interface and a navigation structure generated from a structured document including information extracted from the unstructured document is displayed in a second pane. Generally, when a user interacts with elements in the navigation structure, document viewer 640 can jump to a portion of the unstructured document including the selected text element and apply one or more visual effects to the portion of the unstructured document including the selected text element. Document viewer 640 additionally may allow a user to edit and remove exiting content from a structured document associated with the unstructured document displayed in the first pane and add information from the unstructured document to the structured document.

Storage 610, as illustrated, includes a document data store 650 and an ontology data store 660. Document data store 650 generally serves as a repository in which structured documents including information extracted from one or more unstructured documents may be stored. Ontology data store 660 generally includes a priori defined relationships between data in various domains of documents that may be processed by the system 600. Document data store 650 and ontology data store 660 may be a relational database, a non-relational database, a flat file store, or any other data repository in which encrypted data may be stored and retrieved.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method for presenting information extracted from an unstructured document, comprising:
   receiving the unstructured document and a structured document defining the unstructured document including content extracted from the unstructured document and coordinate position information in the unstructured document associated with the extracted content;
   rendering the unstructured document in a first pane;
   generating a graphical rendering of the structured document defining the unstructured document in a second pane, the graphical rendering comprising a structure in which the content extracted from the unstructured document and included in the structured document is displayed in a hierarchical format, wherein the hierarchical format comprises a navigation tree in which the content extracted from the unstructured document is illustrated with parent-child relationships in the navigation tree and wherein each entry in the navigation tree is linked to coordinate position information in the unstructured document such that user selection of an entry in the navigation tree causes the unstructured document to be rendered to display content at the linked coordinate position information associated with the selected entry; and
   linking each element in the structured document to the rendered unstructured document based on coordinate position information included in the structured document.

2. The method of claim 1, wherein:
   the associated coordinate position information comprises positional information defining a bounding box in the unstructured document and associated with the selected entry.

3. The method of claim 2, further comprising:
   rendering one or more visual effects on the displayed content in the unstructured document based on the positional information defining the bounding box containing the selected entry.

4. The method of claim 1, further comprising:
   receiving an indication that the selected entry in the structured document includes an inaccurate value and a corrected value for the selected entry; and
   editing the structured document to replace the inaccurate value with the corrected value.

5. The method of claim 1, further comprising:
   receiving an indication that a first content was not extracted from the unstructured document, the indication including a selection of textual content in the unstructured document; and
   adding the first content to the structured document.

6. The method of claim 5, wherein adding the first content to the structured document comprises:
   identifying, in the unstructured document, a location associated with the first content;
   based on the identified location, identifying a location of the first content in one or more intermediate documents; and
   adding a flattened text item to the structured document including the first content and the identified location in the unstructured document and the one or more intermediate documents.

7. A system comprising:
   a processor; and
   a memory having instructions stored thereon which, when executed by the processor, performs an operation for presenting information extracted from an unstructured document, the operation comprising:
   receiving the unstructured document and a structured document defining the unstructured document including content extracted from the unstructured document and coordinate position information in the unstructured document associated with the extracted content,
   rendering the unstructured document in a first pane,
   generating a graphical rendering of the structured document defining the unstructured document in a second pane, the graphical rendering comprising a structure in which the content extracted from the unstructured document and included in the structured document is displayed in a hierarchical format, wherein the hierarchical format comprises a navigation tree in which the content extracted from the unstructured document is illustrated with parent-child relationships in the navigation tree and wherein each entry in the navigation tree is linked to coordinate position information in the unstructured document such that user selection of an entry in the navigation tree causes the unstructured document to be rendered to display content at the linked coordinate position information associated with the selected entry, and
   linking each element in the structured document to the rendered unstructured document based on coordinate position information included in the structured document.

8. The system of claim 7, wherein:
   the associated coordinate position information comprises positional information defining a bounding box in the unstructured document and associated with the selected entry.

9. The system of claim 8, wherein the operation further comprises:
   rendering one or more visual effects on the displayed content in the unstructured document based on the positional information defining the bounding box containing the selected entry.

10. The system of claim 7, wherein the operation further comprises:
    receiving an indication that the selected entry in the structured document includes an inaccurate value and a corrected value for the selected entry; and
    editing the structured document to replace the inaccurate value with the corrected value.

11. The system of claim 7, wherein the operation further comprises:
    receiving an indication that a first content was not extracted from the unstructured document, the indication including a selection of textual content in the unstructured document; and
    adding the first content to the structured document.

12. The system of claim 11, wherein adding the first content to the structured document comprises:
    identifying, in the unstructured document, a location associated with the first content;
    based on the identified location, identifying a location of the first content in one or more intermediate documents; and
    adding a flattened text item to the structured document including the first content and the identified location in the unstructured document and the one or more intermediate documents.

13. A non-transitory computer-readable medium having instructions stored thereon which, when executed by a processor, performs an operation for presenting information extracted from an unstructured document, comprising:
    receiving the unstructured document and a structured document defining the unstructured document including content extracted from the unstructured document and coordinate position information in the unstructured document associated with the extracted content;
    rendering the unstructured document in a first pane;
    generating a graphical rendering of the structured document defining the unstructured document in a second pane, the graphical rendering comprising a structure in which the content extracted from the unstructured document and included in the structured document is displayed in a hierarchical format, wherein the hierarchical format comprises a navigation tree in which the content extracted from the unstructured document is illustrated with parent-child relationships in the navigation tree and wherein each entry in the navigation tree is linked to coordinate position information in the unstructured document such that user selection of an entry in the navigation tree causes the unstructured document to be rendered to display content at the linked coordinate position information associated with the selected entry, and
    linking each element in the structured document to the rendered unstructured document based on coordinate position information included in the structured document.

14. The non-transitory computer-readable medium of claim 13, wherein:
    the associated coordinate position information comprises positional information defining a bounding box in the unstructured document and associated with the selected entry, and
    the operation further comprises rendering one or more visual effects on the displayed content in the unstructured document based on the positional information defining the bounding box containing the selected entry.

15. The non-transitory computer-readable medium of claim 13, wherein the operation further comprises:
    receiving an indication that the selected entry in the structured document includes an inaccurate value and a corrected value for the selected entry; and
    editing the structured document to replace the inaccurate value with the corrected value.

16. The non-transitory computer-readable medium of claim 13, wherein the operation further comprises:
    receiving an indication that a first content was not extracted from the unstructured document, the indication including a selection of textual content in the unstructured document; and
    adding the first content to the structured document.

17. The non-transitory computer-readable medium of claim 16, wherein adding the relevant content to the structured document comprises:
    identifying, in the unstructured document, a location associated with the first content;
    based on the identified location, identifying a location of the first content in one or more intermediate documents; and
    adding a flattened text item to the structured document including the first content and the identified location in the unstructured document and the one or more intermediate documents.

* * * * *